United States Patent [19]

Vanderlaan

[11] Patent Number: 5,004,940
[45] Date of Patent: Apr. 2, 1991

[54] DIRECT DRIVE VALVE FORCE MOTOR WITH GAIN SHAPING PROVISION

[75] Inventor: Robert D. Vanderlaan, Kalamazoo, Mich.

[73] Assignee: Pneumo Abex Corporation, Boston, Mass.

[21] Appl. No.: 98,075

[22] Filed: Sep. 21, 1987

[51] Int. Cl.$^5$ .............................................. H02K 33/12
[52] U.S. Cl. ............................................. 310/36; 310/90
[58] Field of Search ................... 310/36, 37, 38, 156, 310/187, 190, 192, 193, 194; 335/230, 266, 267, 272, 274, 276, 299

[56] References Cited

U.S. PATENT DOCUMENTS

| | | | |
|---|---|---|---|
| 2,383,971 | 9/1945 | Ivy | 310/190 |
| 3,421,033 | 1/1969 | Hoffmeyer | 310/192 |
| 3,441,760 | 4/1969 | Collens | 310/191 |
| 4,135,119 | 1/1979 | Brosens | 310/36 |
| 4,510,403 | 4/1985 | Vandelaan et al. | 310/36 |

*Primary Examiner*—Steven L. Stephan
*Assistant Examiner*—Judson H. Jones

*Attorney, Agent, or Firm*—Renner, Otto, Boisselle & Sklar

[57] ABSTRACT

Limited angle torque motor includes a secondary magnetic flux path of relatively small cross-sectional area which increases the rotational and torque gains of the motor in a localized area about the motor null as if the magnetic air gap of the motor were substantially reduced so that when properly matched with a direct drive valve having significant valve overlap, a desired linear valve flow gain can be achieved. As the motor flux increases with applied current, the secondary flux path saturates, whereby further increases in current above a specified level are directed into the main pole structure magnetic flux path as if the secondary flux path did not exist. In one form of the invention, the desired secondary flux path is formed by providing the main magnetic pole structures with one or more small sections which span the magnetic air gap, whereas in another form of the invention, such secondary flux path is provided by placing a magnetic shim against the end faces at one or both ends of the magnetic housing.

23 Claims, 5 Drawing Sheets

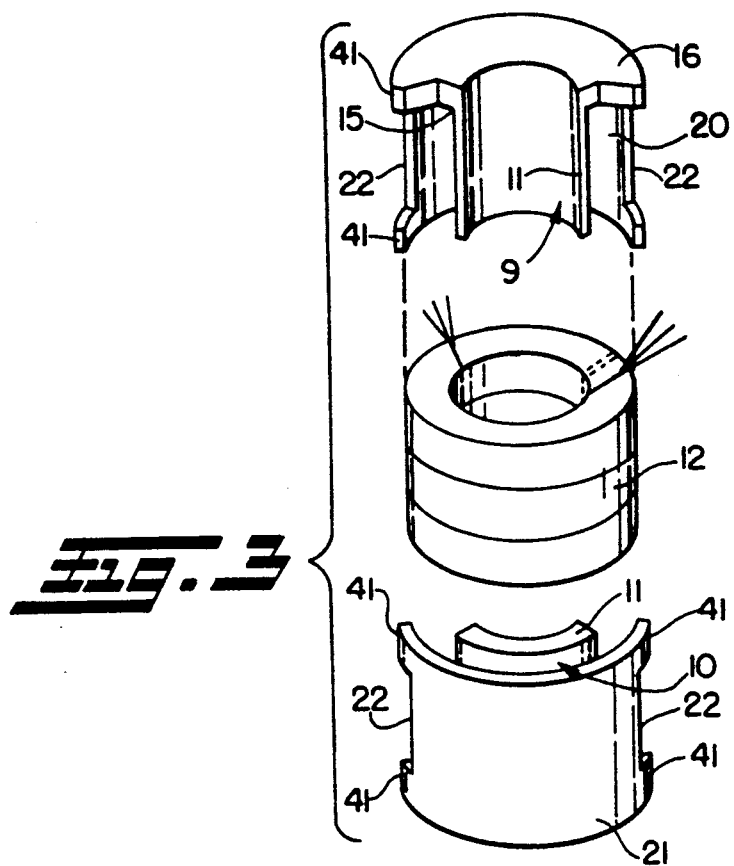
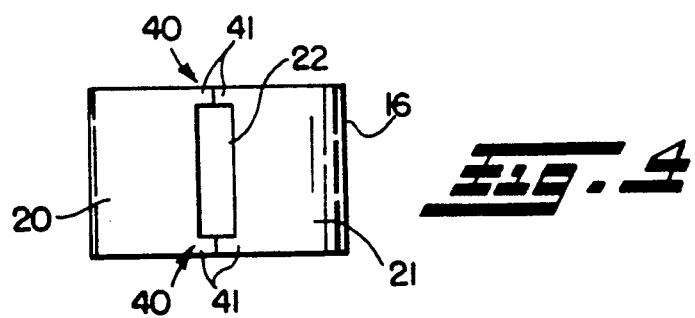
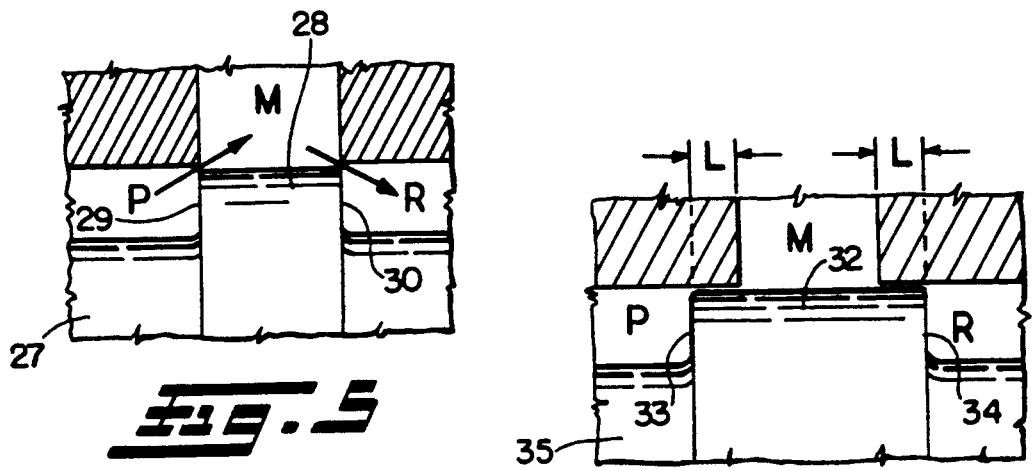

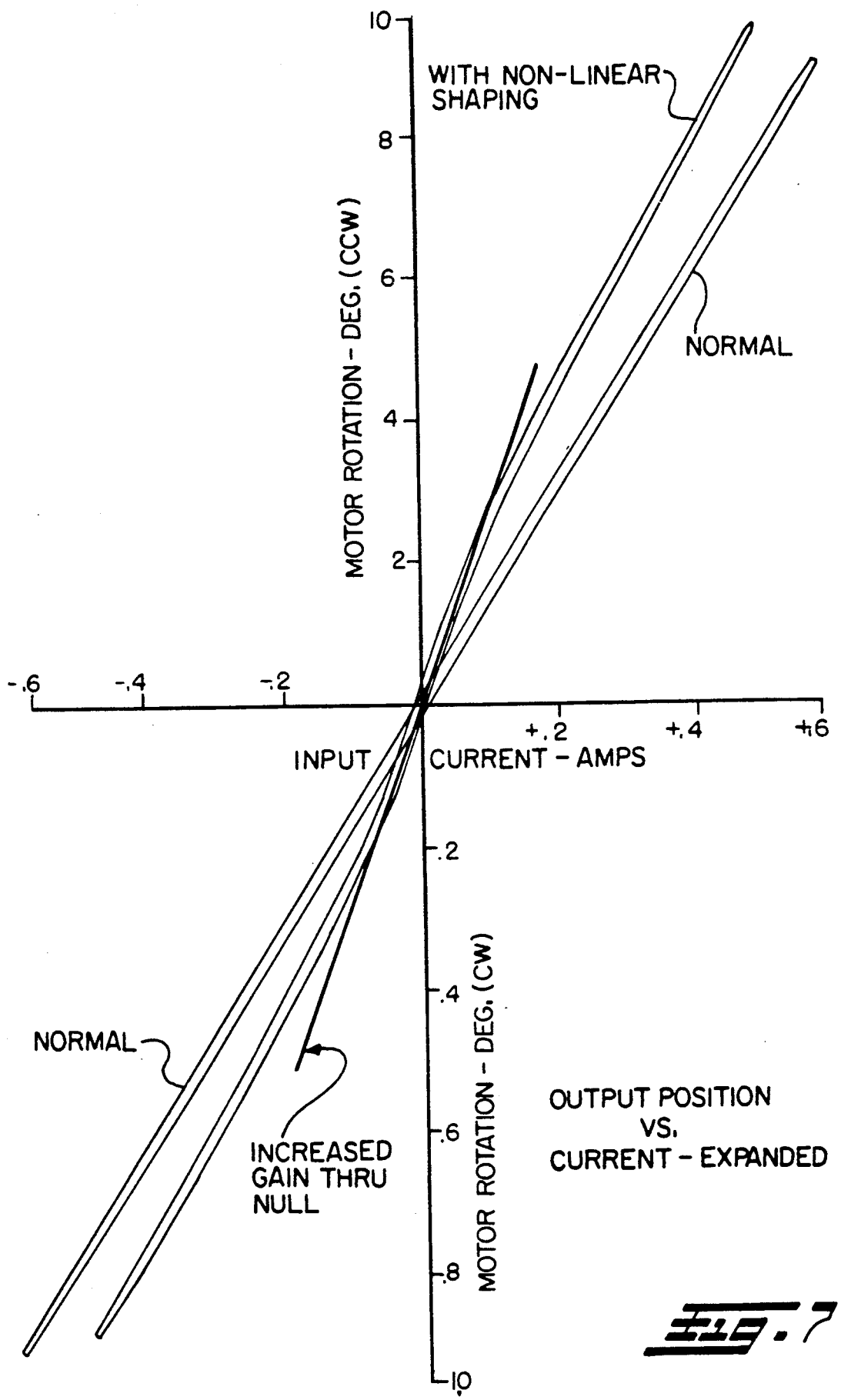

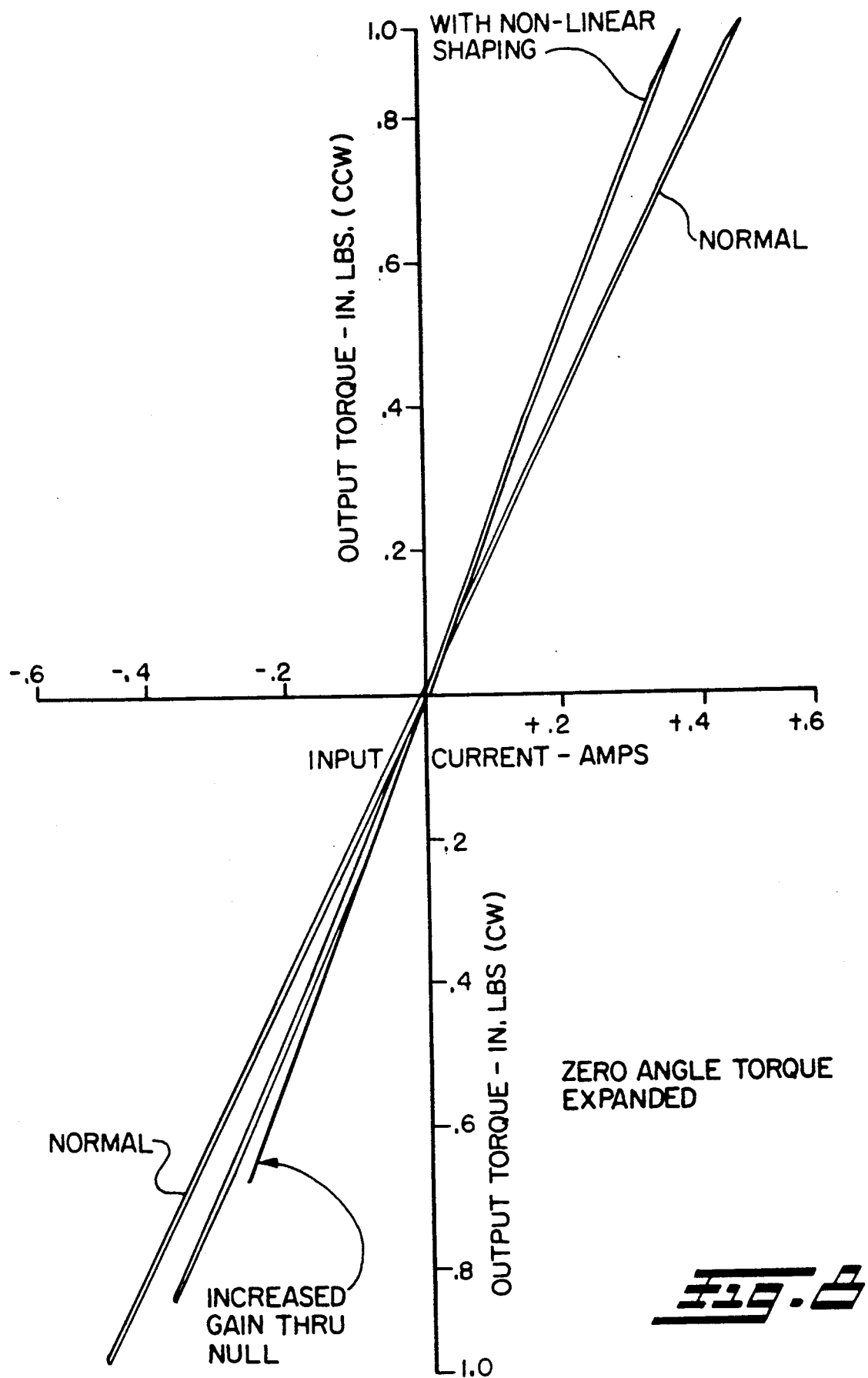

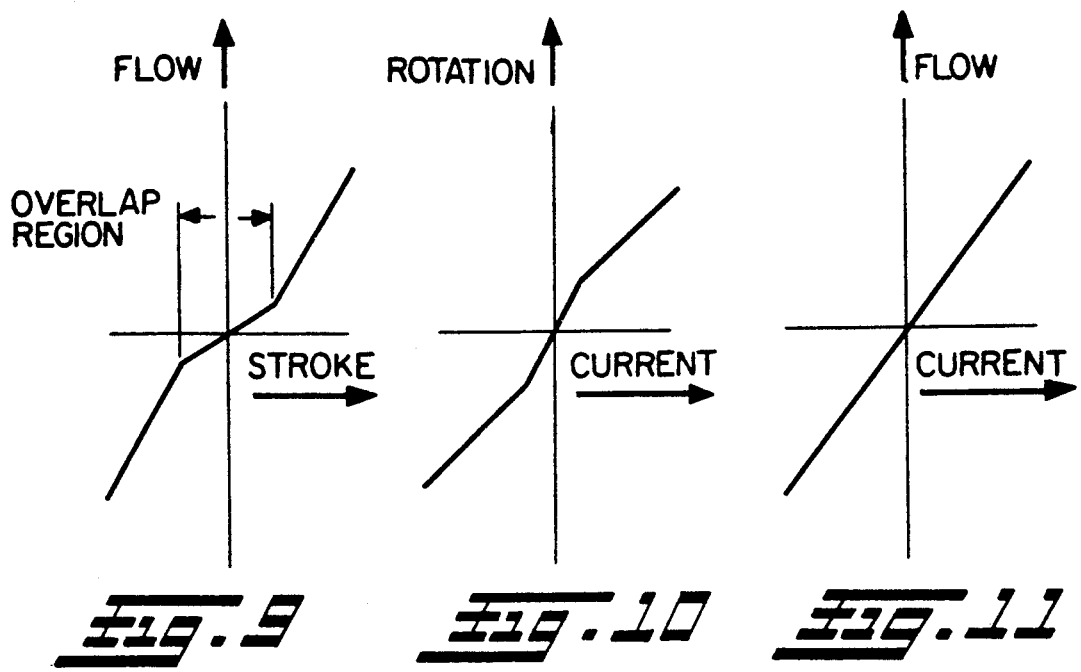
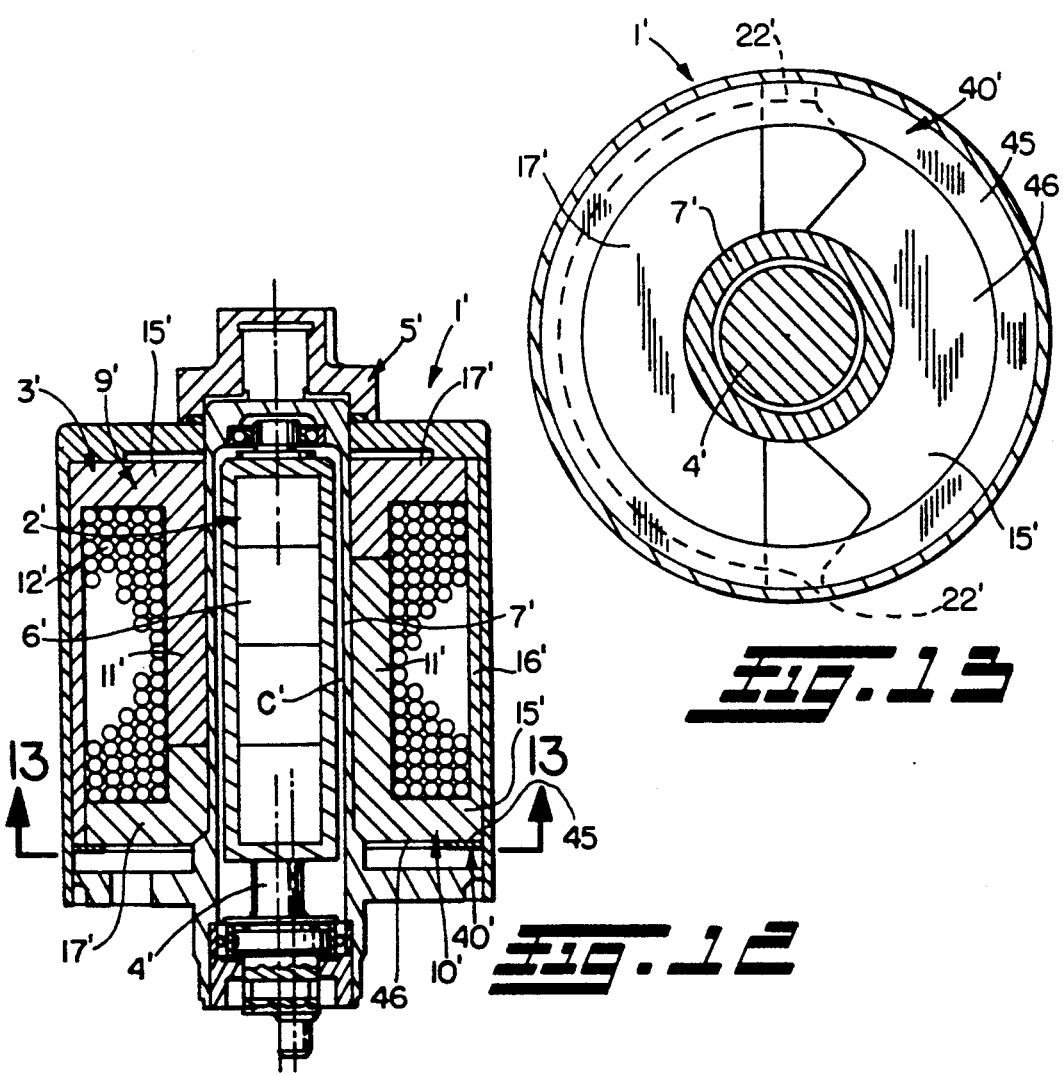

DIRECT DRIVE VALVE FORCE MOTOR WITH GAIN SHAPING PROVISION

BACKGROUND OF THE INVENTION

This invention relates generally, as indicated, to a direct drive valve force motor with gain shaping provision. More particularly, this invention relates to certain improvements in limited angle torque motors generally of the type shown in U.S. Pat. No. 4,510,403, which is incorporated herein by reference, and is assigned to the same assignee as the present application.

Motors of this type are particularly suited for use in certain types of direct drive valve servo actuation systems such as those used to actuate aircraft flight controls and the like. Such systems are required to meet precise and demanding performance characteristics, particularly about the neutral position of the actuator and more particularly about the neutral position of the direct drive valve associated therewith.

An important aspect of such a direct drive valve is its ability to perform well with a relatively low level of hydraulic fluid leakage. High fluid leakage may result in excessive heat generation, increased power requirements, and associated weight and increased operational costs.

More recently, with the advent of very high pressure hydraulic systems of up to 8,000 psi, valve leakage about the neutral position has become a much greater concern in that, for an equivalent metering orifice, valve neutral leakage at 8,000 psi may be two or more times that at 3,000 psi.

One way to reduce valve neutral leakage and associated hydraulic power consumption without compromising performance is to provide a significant amount of valve metering orifice overlap. However, this has the disadvantage that the valve plunger must travel through a greater distance (corresponding to the overlap region) before substantial flow begins.

Another area of concern with such a direct drive valve construction involves the friction related breakout force of the valve plunger about its neutral position. Breakout friction can cause excessive threshold levels, instability, and low amplitude frequency response degradation.

SUMMARY OF THE INVENTION

With the foregoing in mind, it is a principal object of this invention to provide an improved limited angle torque motor which compensates for the very low flow gain about hydraulic null of a direct drive valve having significant valve overlap when in its neutral position.

Another object is to provide such a motor which linearizes flow gain in the valve null region of such a direct drive valve.

Still another object is to provide such a motor which increases the force potential for actuating a direct valve about its neutral position, thereby improving threshold, null stability, and low amplitude frequency response.

Another object is to provide such a motor which accomplishes the various objectives enumerated above in a producible, cost effective and highly reliable way.

These and other objects of the present invention may be achieved by providing a limited angle torque motor with a secondary magnetic flux path of relatively small cross-sectional area which increases the rotational and torque gains of the motor in a localized area about motor null as if the magnetic air gap of the motor were substantially reduced so that when properly matched with a direct drive valve having significant valve overlap, a desired linear valve flow gain can be achieved. However, as the motor flux increases with applied current, the secondary flux path saturates. Accordingly, further increases in current are redirected into the main magnetic flux paths of the motor pole structure as if the secondary flux path or paths did not exist.

In one form of the invention disclosed herein, the desired secondary flux path is formed by providing the magnetic pole piece structures with one or more small sections which span the magnetic air gaps of the motor, whereas in another form of the invention disclosed herein, such secondary flux path is provided by placing a magnetic iron shim against the end faces at one or both ends of the motor pole pieces.

To the accomplishment of the foregoing and related ends, the invention, then, comprises the features hereinafter fully described and particularly pointed out in the claims, the following description and the annexed drawings setting forth in detail certain preferred embodiments of the invention, these being indicative, however, of but several of the various ways in which the principles of the invention may be employed.

BRIEF DESCRIPTION OF THE DRAWINGS

In the annexed drawings:

FIG. 3 is an exploded perspective view of the stator assembly portion of the motor of FIG. 1;

FIG. 4 is a side elevation view of the stator assembly of FIG. 3 when assembled;

FIG. 5 is an enlarged fragmentary longitudinal section through a valve plunger with minimum metering orifice overlap;

FIG. 6 is an enlarged fragmentary longitudinal section through another valve plunger having a significant amount of metering orifice overlap;

FIG. 7 is a graphic illustration of the motor shaft positions of both an existing motor design (labeled "NORMAL") and a representative motor constructed in accordance with this invention (labeled "WITH NON-LINEAR SHAPING") for different levels of applied direct or pulse width modulated current;

FIG. 8 is a graphic illustration of the output torque of both an existing motor design and a representative motor constructed in accordance with this invention, similarly labeled as in FIG. 7, for different levels of applied current;

FIG. 9 is a graphic illustration of the flow gain for the valve plunger of FIG. 6 about hydraulic null;

FIG. 10 is a graphic illustration of how a representative motor constructed in accordance with this invention increases the rotational gain of the motor in a localized area about motor null for different levels of applied current;

FIG. 11 is graphic illustration of the linear flow output of a valve plunger of the type shown in FIG. 6 when driven by a representative motor constructed in accordance with this invention for different levels of applied current;

FIG. 12 is a fragmentary longitudinal section through another form of limited angle torque motor in accordance with this invention; and FIG. 13 is a transverse section through the motor of FIG. 12 taken generally along the plane of the line 13—13 thereof.

DETAILED DESCRIPTION OF THE PREFERRED EMBODIMENTS

Figure 1:
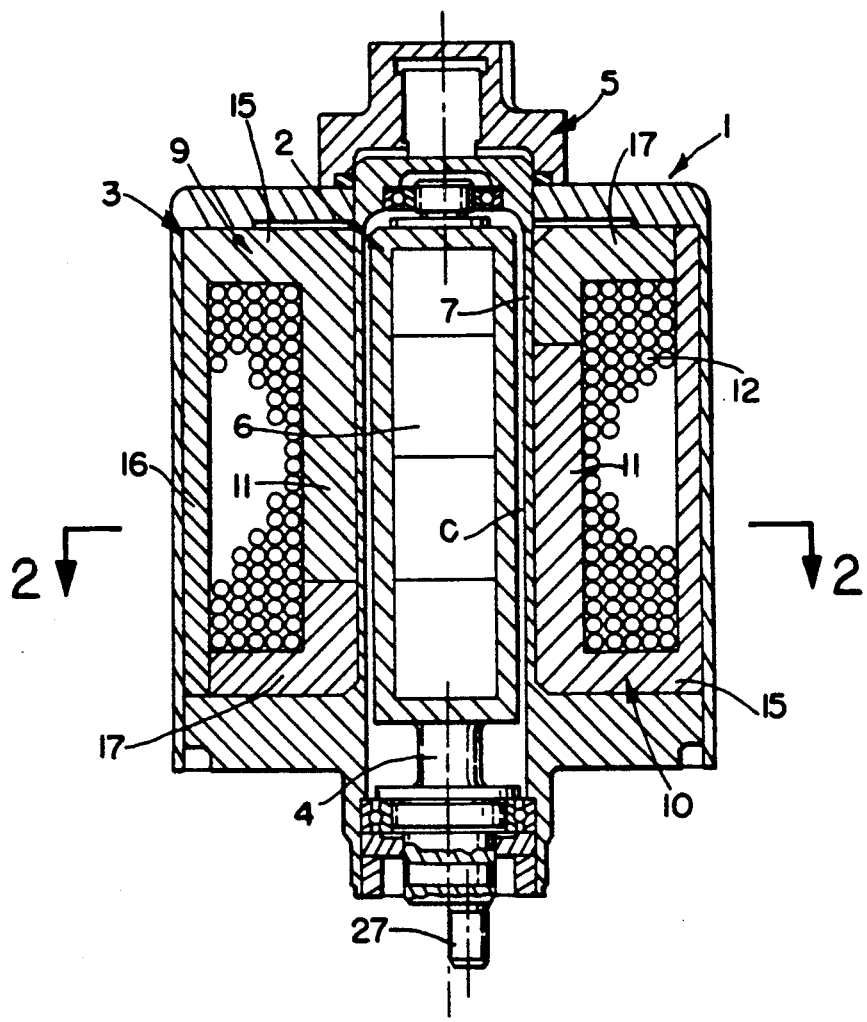
FIG. 1 is a fragmentary longitudinal section through one form of limited angle torque motor in accordance with this invention.
Figure 2:
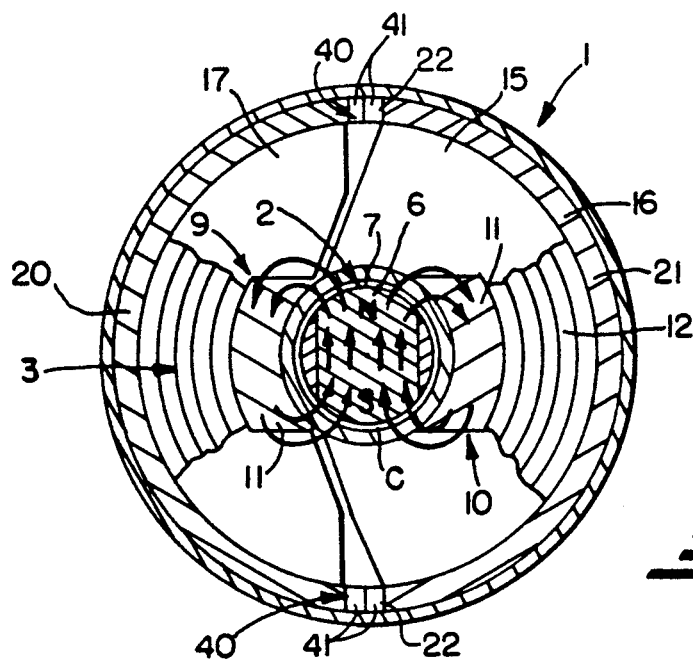
FIG. 2 is a fragmentary transverse section through the motor of FIG. 1 taken generally along the plane of the line 2—2 thereof.

Referring now in detail to the drawings, and initially to FIGS. 1 and 2, there is shown one form of limited angle torque motor 1 in accordance with this invention which is a non-commutated 2-pole stationary coil rotary magnet motor generally of the type disclosed in U.S. Pat. No. 4,510,403 including a rotor assembly 2 and a stator assembly 3 surrounding same. The rotor assembly 2 includes a rotor shaft 4 suitably journaled for rotation within a motor housing 5. Supported by the rotor shaft 4 for rotation therewith are one or more permanent magnets 6 which are magnetized in the diametrical direction, that is, the north and south poles N and S of the magnets are diametrically oriented as shown in FIG. 2.

A stationary rotor casing or sleeve 7 surrounds the rotor assembly 2 in slightly radially spaced relation therefrom to provide a flux path clearance C therebetween. The rotor casing 7 is in turn surrounded by the stator assembly 3 which includes one or more pairs of circumferentially spaced pole pieces 9, 10. Each pole piece 9, 10 is desirably of the same general construction including a generally axially extending pole blade 11 about which one or more stator coils 12 are circumferentially wound with the axes of the coils generally parallel to the rotor axis.

A stator magnetic pole flange or end portion 15 extends radially outwardly from one end only of each stator pole blade 11, with such pole pieces 9, 10 arranged such that the stator magnetic pole flanges 15 are at opposite ends thereof as shown in FIG. 1. Also, such pole pieces 9, 10 include an outer magnetic housing structure 16 surrounding the stator coils 12 to provide a magnetic return path therefor. Accordingly, when the stator coil(s) 12 are excited by a direct or pulse width modulated current, the stator magnetic pole flanges 15 will cause a cross or transverse flux through the stator and rotor assemblies 2, 3 which produces a turning torque in the motor 1.

At the ends of the pole pieces 9, 10 opposite the respective pole flanges 15 are end plates 17 which may be made of a substantially non-magnetic material such as non-magnetic aluminum.

Preferably, the magnetic housing structure 16 is formed in two halves 20, 21, with an air gap 22 between one or both ends of the magnetic housing structure halves as schematically shown in FIGS. 2–4, whereby the magnetic flux produced by the permanent rotor magnets 6 will generally follow the paths schematically illustrated in FIG. 2 running from the magnetic north pole N in opposite directions through the magnetic poles 9, 10 and back to the magnetic south pole S. This magnetic flux develops a magnetic reluctance torque that tends to center the rotor north and south poles about axis extending substantially centrally between the opposed side edges of the pole blades 11 as schematically shown in FIG. 2.

As more fully described in U.S. Pat. No. 4,510,403, if the rotor shaft 4 is rotated by an external force, the magnetic reluctance torque develops a restoring torque which varies in magnitude with rotation and acts in opposition to the applied external force tending to return the rotor north and south poles to the original centered position shown in FIG. 2. Such magnetic reluctance torque produced by the magnet fluxes may be used to provide a centering function for the rotor shaft 4 tending to return the motor shaft to the centered position shown in FIG. 2 in which the motor angle equals 0° whenever the current to the stator coils 12 is interrupted. By varying length of the air gaps 22 in the outer magnetic housing structure 16 of the pole pieces 9, 10, the intensity of the magnetic restoring torque may be varied to obtain a particular magnetic centering spring rate at a particular torque or power level. As the length of the air gap or gaps 22 increases, the magnetic restoring torque increases. Conversely, as the length of the air gap or gaps 22 decreases, the magnetic restoring torque decreases.

Also as more fully described in U.S. Pat. No. 4,510,403, an electro-magnetic or magnetic fields torque is developed when the stator coils 12 are excited which is proportional to the amount of direct or pulse width modulated current passing through the stator coils. When a positive current is applied, a positive torque tending to rotate the rotor shaft in a clockwise direction as viewed in FIG. 2 is produced, whereas when a negative current is applied, a negative torque tending to rotate the motor shaft in a counterclockwise direction is produced over the same excursion of the rotor shaft, or vice versa.

These two torques, i.e. the magnetic reluctance and interaction of magnetic field torques, combine to produce various shapes of the torque and motor shaft position curves which will vary depending on the magnetic reluctance torque profile for a given motor design. However, before any useful work output can be obtained with such a motor design, sufficient direct or pulse width modulated current must be applied to the stator coils 12 to produce a magnetic fields torque which is sufficiently greater than that consumed in overcoming the magnetic reluctance torque to obtain the desired useful torque output over the required angle of rotation of the rotor shaft. To translate the rotary output of the motor 1 to linear movement of a valve member driven thereby, an eccentric or other suitable form of rotary to linear gearing 27 may be provided on the outer end of the output shaft 4 for connection to the valve member through a suitable drive linkage, not shown.

A limited angle torque motor of the type disclosed in U.S. Pat. No. 4,510,403 is very effective in directly driving a valve plunger 27 of the type shown in FIG. 5 of the present application, including the usual lands 28 with minimum metering orifice overlap at the ends 29, 30 of the lands for metering fluid flow between the metering orifice M and a pressure source P or return R. However, in very high pressure hydraulic systems of up to 8,000 psi, if the plunger lands 32 are extended to provide a significant amount of metering orifice overlap at the spool land ends 33, 34 to restrict the leakage flow paths as schematically shown in FIG. 6, the plunger 35 must travel through the overlap region L before substantial flow begins. This condition causes a very low flow gain in the overlap region about hydraulic null as schematically illustrated in FIG. 9, and cannot be compensated for by the limited angle torque motor of U.S. Pat. No. 4,510,403, in that the rotational gain (degrees-/amp) is generally linear over the useful operating range for such motor as schematically illustrated by the curve marked "NORMAL" in FIG. 7.

In accordance with the present invention, the improved motor designs disclosed herein are provided with a secondary magnetic flux path of relatively small cross-sectional area to provide a non-linearity of the rotational and torque gains of the motors so that such rotational and torque gains are substantially increased in a localized area about motor null. In one form of the invention illustrated in FIGS. 1-4, the desired secondary flux path 40 is formed by providing the magnet pole structure 9, 10 with one or more small magnetic sections 41 at both ends of the magnetic housing structure halves 20, 21 which span the magnetic air gaps 22. In another form of the invention shown in FIGS. 12 and 13, such secondary flux path or paths 40' are provided by placing a magnetic iron shim 45 or the like against the end faces 46 at one or both ends of the pole structures 9', 10', rather than using small magnetic sections to span the magnetic pole air gaps as shown in FIGS. 1-4. Otherwise, the details of construction and operation of the limited angle torque motor 1' shown in FIGS. 12 and 13 are substantially the same as that shown in FIGS. 1-4, and accordingly the same reference numerals followed by a prime symbol are used to designate like parts.

The secondary magnetic flux paths 40, 40' effectively reduce the magnetic air gaps 22, 22' to increase the rotational gain in a localized area about motor null as schematically illustrated in FIG. 10 and as shown by the curve marked "WITH NON-LINEAR SHAPING" in FIG. 7. Similarly, such secondary magnetic flux paths 40, 40' effectively increase the torque gain in such localized area about motor null as schematically illustrated by the curve marked "WITH NON-LINEAR SHAPING" in FIG. 8.

However, as FIGS. 7 and 8 also clearly illustrate, with the motor designs 1 and 1' of the present invention, as the flux increases with applied current, a level will be reached at which the secondary magnetic flux paths 40, 40' will become magnetically saturated, whereby increases in current above that level will be redirected into the main pole structure magnetic paths to provide reduced rotational and torque gains at the higher current levels outside the motor null. By properly combining such a motor 1 or 1' having this non-linear feature with a valve 35 of the type shown in FIG. 6 having a significant amount of metering orifice overlap, an ideal linear match can be achieved to obtain linear flow output with applied current as schematically illustrated in FIG. 11. Also, because of the increased torque gain of the motor 1 or 1' of the present invention in the null region, such a motor greatly increases the force potential of the direct drive valve 35 about its neutral position, thereby improving the threshold, null stability and low amplitude frequency response of the valve as well as linearizing the flow gain of the valve in the valve null region in a producible, cost effective and highly reliable way.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A limited angle torque motor comprising a rotor assembly, a stator assembly surrounding said rotor assembly, said rotor assembly and stator assembly being mounted for relative rotation, said rotor assembly including permanent magnet means magnetized in the diametrical direction, and said stator assembly including circumferentially spaced stator magnetic poles, stator coil means wrapped about said magnetic poles which when excited by direct or pulse width modulated current produce a cross flux between said stator assembly and rotor magnet means causes said rotor assembly to rotate relative to said stator assembly through a limited rotational angle range, an outer magnetic housing surrounding said stator coil means defining a magnetic return path for the magnetic field with is produced when said stator coil means is excited, air gap means in said magnetic return path which causes the magnetic flux produced by said permanent magnet means to follow a primary magnetic flux path from said permanent magnet means through said stator magnetic poles that produces a magnetic reluctance torque urging said rotor assembly to a null position, and means defining a secondary magnetic flux path of relatively small cross-section area compared to said primary magnetic flux path from said permanent magnet means through said stator magnetic poles and magnetic housing that increases the rotational and torque gains in a localized area about such null position, said means defining a secondary magnetic flux path comprising magnetic means for bridging said air gap means at one or more points along the length of said air gap means, said magnetic means having a relatively small cross-sectional area which becomes saturated at a specified level of applied current, whereby increases in current above such specified level will be redirected into said primary magnetic flux path to provide reduced rotational and torque gains at higher current levels outside such null position.

2. The torque motor of claim 1 wherein said air gap means is formed in said magnetic housing, and said magnetic means comprises a relatively small magnetic section extending across said air gap means.

3. The torque motor of claim 2 wherein said magnetic means comprises a plurality of said relatively small magnetic sections extending across said air gap means.

4. The torque motor of claim 3 wherein said magnetic sections extend from opposite sides of said air gap means in said magnetic housing into abutting engagement with each other.

5. The torque motor of claim 4 wherein there are a plurality of spaced-apart pairs of said magnetic sections extending from opposite sides of said air gap means in said magnetic housing into abutting engagement with each other.

6. The torque motor of claim 5 wherein said pairs of magnetic sections are located at opposite ends of said air gap means.

7. The torque motor of claim 6 wherein said magnetic sections are integral with said magnetic housing.

8. The torque motor of claim 1 wherein said magnetic housing comprises two halves each having opposite ends in spaced relation from each other to define two of said air gap means therebetween, and said magnetic means comprises a relatively small magnetic section extending across each of said air gap means.

9. The torque motor of claim 8 wherein there are a pair of said magnetic sections extending from opposite sides of each of said air gap means in said magnetic housing into abutting engagement with each other.

10. The torque motor of claim 8 wherein there are two laterally spaced apart pairs of said magnetic sections extending from opposite sides of each of said air gap means in said magnetic housing into abutting engagement with each other.

11. The torque motor of claim 10 wherein said pairs of magnetic sections are located at opposite ends of each of said air gap means.

12. The torque motor of claim 11 wherein said magnetic sections are integral with said magnetic housing.

13. A limited angle torque motor comprising a rotor assembly, a stator assembly surrounding said rotor assembly, said rotor assembly and stator assembly being mounted for relative rotation, said rotor assembly including permanent magnet means magnetized in the diametrical direction, and said stator assembly including circumferentially spaced stator magnetic poles, stator coil means wrapped about said magnetic poles which when excited by direct or pulse width modulated current produce a cross flux between said stator assembly and permanent magnet means which causes said rotor assembly to rotate relative to said stator assembly through a limited rotational angle range, an outer magnetic housing surrounding said stator coil means defining a magnetic return path for the magnetic field which is produced when said stator coil means is excited, air gap means in said magnetic return path which causes the magnetic flux produced by said permanent magnet means to follow a primary magnetic flux path from said permanent magnet means through said stator magnetic poles that produces a magnetic reluctance torque urging said rotor assembly to a null position, and means defining a secondary magnetic flux path of relatively small cross-section area compared to said primary magnetic flux path from said permanent magnet means through said stator magnetic poles and magnetic housing that increases the rotational and torque gains in a localized area about such null position, said means defining a secondary magnetic flux path comprising magnetic means for bridging said air gap means at one or more points along the length of said air gap means, said air gap means being formed in said magnetic housing, and said magnetic means comprising a magnetic shim at one end of said magnetic housing.

14. The torque motor of claim 13 wherein said magnetic shim is generally ring-shaped.

15. The torque motor of claim 14 wherein said magnetic shim is in abutting engagement with said one end of said magnetic housing for bridging said air gap means at said one end.

16. A limited angle torque motor comprising a rotor assembly, a stator assembly surrounding said rotor assembly, said rotor assembly and stator assembly being mounted for relative rotation, said rotor assembly including permanent magnet means magnetized in the diametrical direction, and said stator assembly including circumferentially spaced stator magnetic poles, stator coil means wrapped about said magnetic poles which when excited by direct or pulse width modulated current produce a cross flux between said stator assembly and rotor magnet means which causes said rotor assembly to rotate relative to said stator assembly through a limited rotational angle range, an outer magnetic housing surrounding said stator coil means defining a magnetic return path for the magnetic field which is produced when said stator coil means is excited, air gap means in said magnetic return path which causes the magnetic flux produced by said permanent magnet means to follow a primary magnetic flux path from said permanent magnet means through said stator magnetic poles that produces a magnetic reluctance torque urging said rotor assembly to a null position, and means defining a secondary magnetic flux path of relatively small cross-section area compared to said primary magnetic flux path from said pemanent magnet means through said stator magnetic poles and magnetic housing that increases the rotational and torque gains in a localized area about such null position, said means defining a secondary magnetic flux path comprising magnetic means for bridging said air gap means at one or more points along the length of said air gap means, said magnetic housing comprising two halves each having opposite ends in spaced relation from each other to define two of said air gap means therebetween, and said magnetic means comprising a relatively small magnetic section extending across each of said air gap means, said magnetic means comprising a magnetic shim.

17. The torque motor of claim 16 wherein said magnetic shim bridges both of said air gap means at one end of said magnetic housing.

18. The torque motor of claim 17 wherein said magnetic shim is in the shape of a ring in abutting engagement with said one end of said magnetic housing for bridging said air gap means at said one end.

19. In combinatin, a limited angle torque motor and a valve driven thereby, said valve including a valve plunger having extended land means providing increased metering orifice overlap to restrict leakage past said land means when said valve plunger is in a valve null position, and said limited angle torque motor comprising a rotor assembly, a stator assembly surrounding said rotor assembly, said rotor assembly and stator assembly being mounted for relative rotation, said rotor assembly including permanent magnet means magnetized in the diametrical direction, and said stator assembly including circumferentially spaced stator magnetic poles, stator coil means wrapped about said magnetic poles which when excited by direct or pulse width modulated current produce a cross flux between said stator assembly and permanent magnet means which causes said rotor assembly to rotate relative to said stator assembly through a limited rotational angle range which drives said valve plunger from such valve null position to a position beyond said increased metering orifice overlap and return, an outer magnetic housing surrounding said stator coil means defining a magnetic return path for the magnetic field which is produced when said stator coil means is excited, air gap means in said magnetic return path which causes the magnetic flux produced by said permanent magnet means to follow a primary magnetic flux path from said permanent magnet means through said stator magnetic poles that produces a magnetic reluctance torque urging said rotor assembly to a motor null position, and means defining a secondary magnetic flux path of relatively small cross-section area compared to said primary magnetic flux path from said permanent magnet means through said stator magnetic poles and magnetic housing that increases the rotational and torque gains in a localized area about such motor null position to increase the rate of movement of said valve plunger through said increased metering orifice overlap, said means defining a secondary magnetic flux path comprising magnetic means for bridging said air gap means at one or more points along the length of said air gap means to increase the rotational and torque gain of said rotor assembly in a localized area about such motor null position substantially corresponding to said increased metering orifice overlap, said magnetic means being of relatively small cross-sectional area which becomes saturated at a specified level of applied current substantially corresponding to that required to move said valve plunger through said increased metering orifice overlap, whereby increases in current above such specified level will be redirected into said primary magnetic flux path to provide reduced rotational and torque gains at higher current levels outside such motor null position, thereby providing for substantially linear flow output at said valve with applied current during movement of said valve plunger from such valve null position to such position beyond said increased metering orifice overlap.

20. The combination of claim 19 wherein said air gap means is formed in said magnetic housing, and said magnetic means comprises a magnetic shim at one end of said magnetic housing.

21. The combination of claim 19 wherein said air gap means is formed in said magnetic housing, and said magnetic means comprises a plurality of relatively small magnetic sections extending across said air gap means.

22. The combination of claim 20 wherein said magnetic shim is generally ring-shaped.

23. The combination of claim 22 wherein said magnetic shim is in abutting engagement with said one end of said magnetic housing for bridging said air gap means at said one end.

* * * * *